United States Patent [19]
Miida et al.

[11] Patent Number: 4,716,466
[45] Date of Patent: Dec. 29, 1987

[54] IMAGE SENSOR

[75] Inventors: Takashi Miida, Tokyo; Akira Takei, Yokohama; Kiyoshi Tashiro, Chiba, all of Japan

[73] Assignee: Fujitsu Limited, Kanagawa, Japan

[21] Appl. No.: 738,331

[22] Filed: May 28, 1985

[30] Foreign Application Priority Data

May 31, 1984 [JP] Japan .................. 59-111221

[51] Int. Cl.$^4$ ................. H04N 3/14; H01L 29/78
[52] U.S. Cl. ..................... 358/213.26; 357/24
[58] Field of Search .......... 358/213, 228, 213.11, 358/213.13, 213.15, 213.19, 213.24, 213.23, 213.25, 213.26, 213.28; 357/24 LR

[56] References Cited

U.S. PATENT DOCUMENTS 3,944,816  3/1976  Harada .................. 358/213.19
4,321,486  3/1982  Boler et al. ............ 357/24 LR
4,479,062 10/1984  Kawasaki et al. ........ 358/213
4,612,454  9/1986  Kihoshita et al. ....... 357/24 LR

FOREIGN PATENT DOCUMENTS 2007937  5/1979  United Kingdom .

Primary Examiner—L. T. Hix
Assistant Examiner—David M. Gray
Attorney, Agent, or Firm—Armstrong, Nikaido, Marmelstein & Kubovcik

[57] ABSTRACT

An image sensor includes charge storage regions which gradually store charges corresponding to the amount of light received, a plurality of image transfer elements which gradually transfer the charges, and transfer gates which transfer the charges in the charge storage regions to the charge transfer elements. The image sensor provides further a device which changes an electric potential of an electrode of the charge storage regions in accordance with the amount stored of the charges, and a device which detects the electric potential of the electrode and outputs the detected electric potential as a switchover timing control signal of the transfer gates.

13 Claims, 10 Drawing Figures

IMAGE SENSOR

BACKGROUND OF THE INVENTION

1. Field of the Invention

The present invention relates to an image sensor. More particularly, it relates to an image sensor which senses an optical state of a device in real time and which has an automatic gain control (AGC) function for determining a time for storing charges.

2. Description of the Related Art

In image sensors usually used as an optical sensor, a plurality of picture element diodes are arranged in a regular pattern with a plurality of columns over the whole surface of a semiconductor substrate; and, between each picture element diode column, first transfer gates which are common to each picture element diode column, and shift registers in a horizontal direction (image sensors) which are also common to each column, are arranged. At one end of the registers in the horizontal direction, a second transfer gate which is common to each shift register in the horizontal direction and a shift register in vertical direction are arranged, and an amplifier is connected to one end of the shift register in the vertical direction.

An optical sensor using such image sensors, has only the function that the charges stored in the picture element diodes by an incidence of light are sent to the amplifier in sequence only by the shift registers, so as to output these variations of the intensity of light as electric signals. Such a device functions sufficiently when the intensity of the light is restricted to a limited range, such as in a facsimile device. However, when it is used, for example, in a camera, in which the dynamic range of the light signal is broad, the function is not properly effective because a light overflow state or too intense a light signal results in an excessive amount of light being received or a decrease in sensitivity results in an insufficient amount of light being received.

OBJECTS AND SUMMARY OF THE INVENTION

An object of the present invention is to provide an image sensor which can be used when the dynamic range of the above-mentioned light signal is broad.

Another object of the present invention is to provide an image sensor comprising an automatic transfer device having an automatic gain control (AGC) function by which the optical state of the device is sensed in real time and the charge storing time is determined thereby.

A further object of the present invention is to provide an image sensor which improves the function of the automatic gain control in such a manner that a high accuracy and high sensitivity can be obtained regardless of the intensity of the light signal.

The above-mentioned objects can be achieved by providing an image sensor comprising charge storage regions for gradually storing charges corresponding to the amount of light received, a plurality stage of charge transfer elements for gradually transferring the charges, and transfer gates for transferring the charges in the charge storage regions to the charge transfer elements. The image sensor also comprises means for changing an electric potential of an electrode of the charge storage regions in accordance with the amount of charges stored, and means for detecting the electric potential of the electrode and for outputting the detected electric potential as a switchover timing control signal for the transfer gates.

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1:
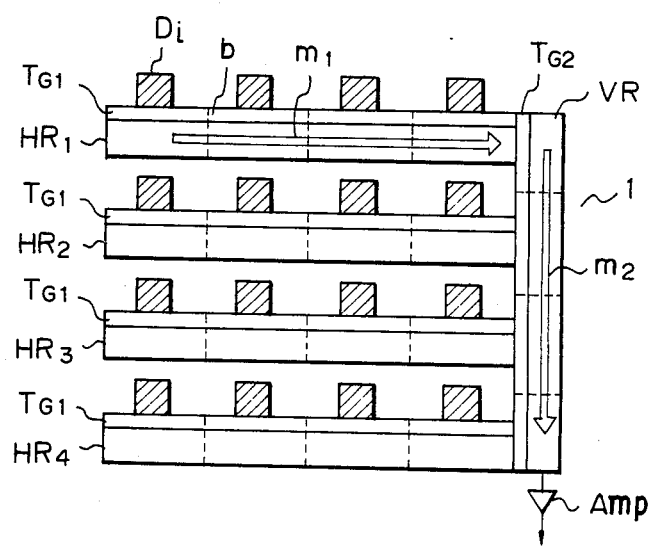
FIG. 1 is a schematic plan view of one example of a conventional image sensor.

In the image sensor usually used in an optical sensor, as schematically shown in FIG. 1, a plurality of picture element diodes $D_i$ are arranged in a regular pattern with a plurality of columns over the whole surface of a semiconductor substrate, and between each picture element diode column, first transfer gates $T_{G1}$ which are common to each picture element diode column and shift registers in the horizontal direction (image sensors) $HR_1$, $HR_2$, $HR_3$, $HR_4$, ..., are arranged. Further, at one end of the registers in the horizontal direction, a second transfer gate $T_{G2}$ which is common to each shift registers $HR_1$, $HR_2$, $HR_3$, $HR_4$, ..., in the horizontal direction and a shift register VR in vertical direction are arranged, and an amplifier Amp is connected to one end of the shift register in the verticl direction. (In FIG. 1, b is a barrier and $m_1$, $m_2$ are arrow directions along which charges are transferred.)

The conventional optical sensor using such an image sensors, has only the function that the charges stored in the picture element diodes $D_i$ by an incidence of light are sent to the amplifier in sequence only by the shift registers, so as to output these charges as electric signals. Such a device functions sufficiently when the intensity of light is restricted to a limited range, such as in a facsimile device. However, when it is used, for example, in a camera, in which the dynamic range of the light signal is broad, the function is not properly effective because a light overflow state or too intense light signal results in an excessive amount of light being received or a decrease in sensitivity results in an insufficient amount of light being received.

Thus, to enable it to be using when the dynamic range of the above-mentioned light signal is broad, in the first embodiment of the present invention, the image sensor has the automatic gain control (AGC) function by which the optical state of the device is sensed at real time and the charge storing time is determined thereby.

That is, in the first embodiment of the present invention, an charge storage region (MIS capacitor) constructed as a metal insulator semiconductor (MIS) is provided between the photo-diode and transfer gate. Further, in the present invention, the following phenomenon is utilized. That is, when, after initially precharging the electrode of this charge storage region, the electrode is placed at a floating state, the potential in the electrode at the floating state changes in accordance with the amount of the electric charges stored in the charge storage region. That is, based on the potential of the electrode, the time for storing electric charges in the charge storage region may be controlled. When the speed for storing the charges is slow, the charges are stored slowly so as to obtain a sufficient output signal, and when the speed for storing the charge is high, the charges are transferred from the charge stoarge region to a charge transfer device so as to prevent the overflow of the charges. By using such an AGC function, a suitable storing time for obtaining a high sensitivity can be selected in accordance with the intensity of incident light.

Namely, when the intensity of incident light is high, the stored time is shortened to prevent the phenomena in which the charges from the charge storing portion overflow and an excess signal state caused is, and when the intensity of incident light is low, the storing time is extended so that a decrease of the output signal can be prevented.

Figures 2A, 2B:
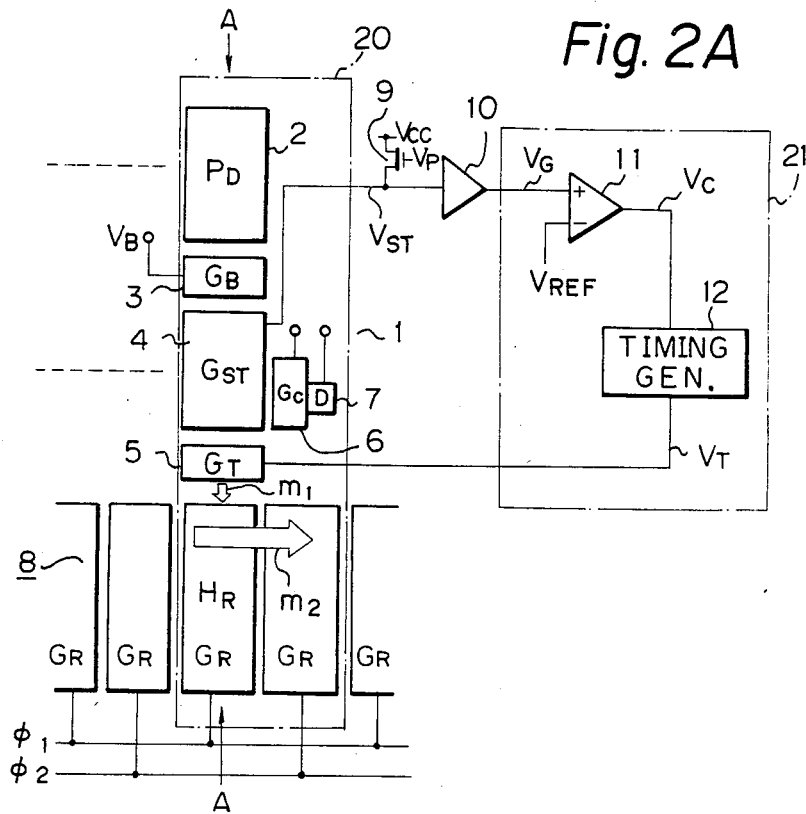
FIGS. 2A and 2B are a schematic plan view and a sectional view, respectively, of a first embodiment of the image sensor according to the present invention.

FIG. 2A shows a plan view and the essential portion of the first embodiment of the present invention and FIG. 2B is a diagram indicating a section along the line A~A in FIG. 2A, including a potential model diagram.

In FIGS. 2A and 2B, 1 is a p type silicon substrate (p-SUB), 2 a photo-diode (PD) which generates electron-hole pairs, that is, charges, by the incidence of a light signal, 3 a barrier gate electrode, 4 a storage gate electrode, 5 a transfer gate electrode, 6 a clear gate electrode, 7 a drain (D), 8 a horizontal shift register (HR), 9 a precharge transistor, 10 a buffer amplifier, 11 a comparator, 12 a timing generator, $m_1$ and $m_2$ arrows indicating a direction along which the charges are transferred, $\phi_1$, $\phi_2$ clock signals, e charge (electron), $V_B$, $V_{ST}$, $V_T$ positive voltages applied to each gate, $V_{CC}$ a power supply line (about 10~12 V), AGC an output for controlling the storage time, and $h\nu$ shows an incidence of light. In the diagram shown in FIG. 2A, the plurality elements 20, shown enclosed by a frame, are provided in parallel, and the portion 21, also enclosed by a frame, may be provided at the outside of the integraced circuit chip.

Further, in FIG. 2A, the voltage $V_B$ is a constant bias voltage, $V_{ST}$ is a potential of the electrode of the charge storing region 4, and it is selected as $V_B < V_{ST}$. The shift register 8 is formed as an analog shift register by a charge-coupled device, $G_R$ are transfer electrodes for transferring the charges, $\phi_1$, $\phi_2$ are driving clock pulses for the charge transfer device, and $\phi_1$ and $\phi_2$ are in a complementary relationship. $V_T$ is the potential of the transfer gate electrode 5, and the electrodes 3, 4, and 5, and the register, are all formed as an MIS construction. Amplifier 10 has an unit amplification factor, that is, the input voltage $V_{ST}$ is equal to the output voltage $V_G$.

In this construction, the barrier gate 3, the storage gate 4, and the transfer gate 5 are supplied by each predetermined positive potential, and the profile of the potential as shown in FIG. 2B is formed on the surface of the substrate 1.

First, the clear gate 6 is turned on to completely clear the charges, stored in a potential well under the storage gate 4, to the drain 7, and thereafter, the clear gate 6 is turned off with a predetermined timing.

At this time, $V_P$ is placed also at a high level, and the precharge transistor 9 is turned on, so that the $G_{ST}$ is precharged to $(V_{cc}-V_{th})$. (wherein $V_{th}$ is a threshold value of the transistor 9). When the precharge of $G_{ST}$ is finished, $V_P$ becomes low level, so that the transistor 9 is turned off. As the input impedance of the buffer amplifier 10 is very high, when the transistor is placed in an off state, $G_{ST}$ becomes a floating state.

Next, the clear gate 6 is turned on, the charges transferred from the photo-diode are stored gradually in the charge storing region 4. The profile of the potential in this case is shown by the solid line in FIG. 2B. As clear from FIG. 2B, the constant bias voltage $V_B$ is given to the barrier gate electrode $G_B$, and a potential well is formed under the barrier gate electrode $G_B$. The value of $V_B$ is set so that the depth of this well is shallower than that of the potential well under the storage gate electrode $G_{ST}$. In another word, the potential barrier is formed in the region under the barrier gate electrode $G_B$.

When the charges transferred from the photo-diode 2 beyond this potential barrier begin to be stored under the storage gate electrode $G_{ST}$, the potential $V_{ST}$ of $G_{ST}$ is decreased. The voltage $V_{ST}$ is input to the buffer amplifier 10 and the output $V_G$ of the buffer amplifier 10 is applied to one input terminal (+) of the comparator 11. As already mentioned, as the voltage amplification factor of the buffer amplifier 10 is one unit, $V_{ST}$ becomes equal to $V_G$. The reference voltage $V_{AEF}$ is applied to another input terminal (−) of the comparator. The value of $V_{REF}$ is set, for example, so that it is equal to the voltage $V_{ST}$ when charges of 80% of the amount of the maximum charges in the charge storage electrode 4 are stored therein. When $V_G$ is decreased in accordance with the increase of the stored charges and becomes smaller than $V_{REF}$, that is, when the amount of the charges exceeds 80% of its maximum, the output $V_C$ of the comparator 11 becomes high level. The timing generator 12 outputs the transfer control pulse $V_T$ in synchronization with a rising of $V_C$. The timing generator is formed by elements such as a one shot multivibrator, etc. When $V_T$ rises to a high level, the transfer gate electrode is turned on, and the charges under $G_{ST}$, as shown by $m_1$, are transferred via the region under $G_T$ to the region under the $G_R$. The profile of the potential under the $G_T$ in this state is shown by a broken line in FIG. 2B. The shift register formed by the charge-coupled device (CCD) transfers the transferred charges along the direction $m_2$. The $G_R$ is driven by the complemental clocks $\phi_1$, $\phi_2$.

In the above-mentioned construction, the charges generated in the photo-diode by the incidence of the light signal are allowed to flow into the potential well of the storage region 4 and are stored therein.

When the charges are stored in the above-mentioned potential well, the potential of the storage gate electrode $G_{ST}$ decreases in proportion to the amount of the charges stored, and thus the storage speed of the electric charge above can be detected by the changing rate of the potential of the storage gate electrode $G_{ST}$. Therefore, the intensity of the incidence light also can be detected by this changing rate of the potential of the storage gate electrode $G_{ST}$.

In the above-mentioned image sensor, an automatic gain control means, which detects the inclination at which the potential of the storage gate electrode $G_{ST}$ decreases, that is, the decreasing rate, is connected to the storage gate electrode $G_{ST}$, and a signal corresponding to the decreasing rate of the potential is sent to the timing system. The time for storing the charges is then adjusted accordingly so that, when the decreasing rate of the potential is high, i.e., the intensity of the incidence light is high, the time for storing the charges is short, and when the decreasing rate of the potential is low, i.e., the intensity of the light is low, the time for storing the charges is long.

Figure 3A:
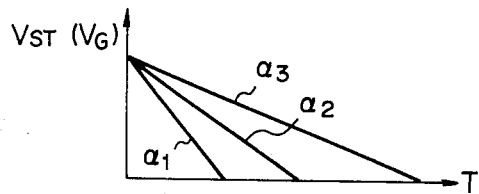
FIGS. 3A and 3B are diagrams explaining the function of the image sensor shown in FIGS. 2A and 2B.
Figure 3B:
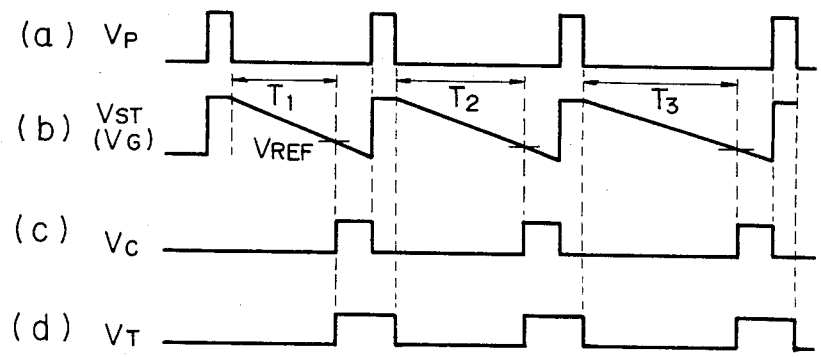

That is, as shown in FIG. 3A, when the intensity of the light is low, the decreasing rate of the potential is low as indicated by the line $\alpha_3$, and when the intensity of the light is high, the decreasing rate of the potential becomes high, as indicated by the line $\alpha_1$. The line $\alpha_2$ shows the case when the intensity of the light is immediate. In FIG. 3A, the abscissa shows the potential $V_{ST}$ of the electrode of the charge storage gate, and the ordinate shows a development of the time. FIG. 3B is a timing chart showing the principle of the automatic control system. In FIG. 3B, (a) is the positive gate signal supplied to the transfer gate 5 and the gate of the precharge transistor 9, (b) is the output of the buffer amplifier 10 (the potential of the electrode of the charge storage gate $G_{ST}$), that is, the input of the comparator 11, wherein the input thereof is compared to a reference voltage $V_{ref}$. In (b) of FIG. 3B, $T_1$, $T_2$, $T_3$ correspond respectively to the decreasing rates of the potential $\alpha_1$, $\alpha_2$, $\alpha_3$ shown in FIG. 3A. ($T_1 < T_2 < T_3$) Further, in FIG. 3B, (c) is the output of the comparator 11 and (d) is the output of the timing generator 12, and the output of the timing generator 12 is supplied to the transfer gate 5. During the output of the timing generator 12, pulses generated at different periods in accordance with the intensity of the light are generated.

Thus, the overflow of the charges from the potential well is prevented, and any deficiency in images is compensated, so that the light receiving accuracy and sensitivity can be improved.

However, in the first embodiment shown in FIGS. 2A and 2B, to enable an easy transfer of the charges, the electrode $G_{ST}$ of the storage gate, the electrode $G_T$ of the transfer gate, and the electrode of the clear gate $G_C$ are usually formed in such a manner that they overlap the end portions of the substrate via a thin insulation film. Therefore, as in the conventional construction, when the charge storage gate is arranged to be in contact with the gate for extracting the charges from the charge storage region 4, that is, the transfer gate and the clear gate, at the time the control signal falls, the potential of the storage gate before the charges are stored is largely lowered by a parasitic coupling capacitance $C_N$ in the overlap portion. When the value of the parasitic coupling capacitance is large, it is preferable to use the construction shown in FIGS. 5A and 5B.

Therefore, in the embodiment shown in FIGS. 2A and 2B, the amount of the stored charges decreases, and thus the signal indicating the potential change of the stored gate cannot be supplied to the amplifier at a signal level within the range of at which a good linearity of the amplifier performance can be attained. Therefore, the problem arises wherein the sensitivity for detecting the potential change in the storage gate due to the automatic gain control means is decreased.

Figure 4:
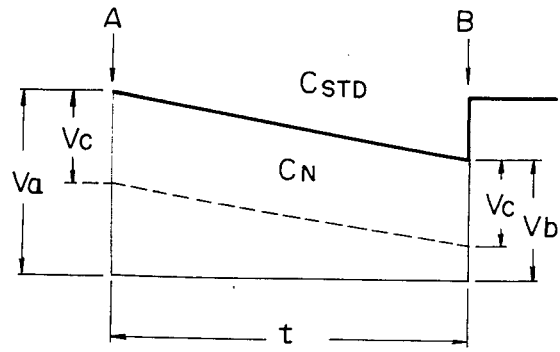
FIG. 4 is a diagram showing the change of the electric potential in the storage gate.

FIG. 4 shows the level change in the storage gate electrode $G_{ST}$, in which A designates a time when the charges in the potential well are completely swept and the clear gate 6 is tuned off, B designates a time when the transfer gate 5 is tuned on and the transfer of the charges to the shift register 8 commences, t is a storage period, $V_a$ and $V_b$ are potentials of the storage gate electrode $G_{ST}$ at the respective times, $V_c$ is a lowered potential due to the coupling capacitance (capacitive noise), $C_{STD}$ is a standard potential falling curve when capacitive noise does not exist, and $C_N$ is a potential falling curve in the construction shown in FIGS. 2A and 2B when capacitive noise does exist.

Figure 5A:
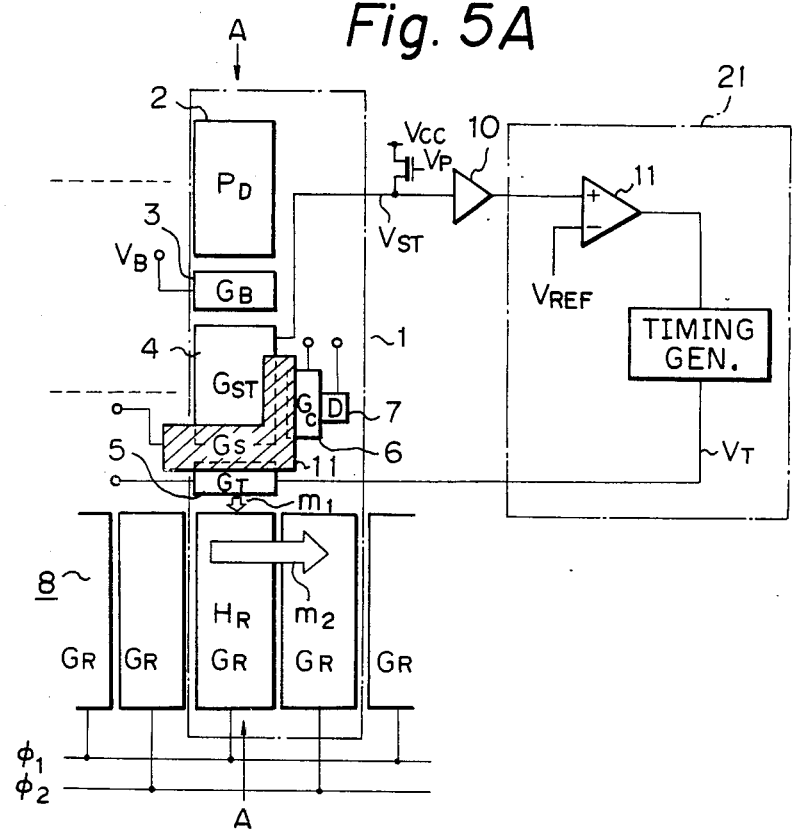
FIGS. 5A and 5B are a schematic plan view and a sectional view, respectively, of a second embodiment of the image sensor according to the present invention.
Figure 5B:
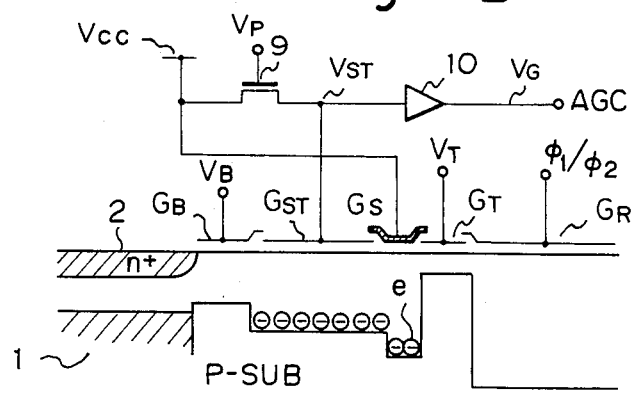

FIGS. 5A and 5B show the construction of a second embodiment of the present invention. In the second embodiment of the present invention, the coupling capacitance generated between the above-mentioned storage gate electrode $G_{ST}$, the transfer gate electrode $G_T$, and the clear gate electrode $G_C$ is removed, a storage gate electrode potential change signal having a high level is supplied to improve the function of the automatic gain control, so that above-mentioned drawback in the prior art can be removed, and a high accuracy and high sensitivity can be obtained regardless of the intensity of the light signal.

That is, in the second embodiment, the shield gate directly connected to the electric source is provided between the charge storage region 4, the transfer gate 5 which extracts the charges from the charge storage region 4, and the clear gate 7, and thus the coupling capacitance between the charge storage gate electrode $G_{ST}$, the transfer gate electrode $G_T$, and the clear gate electrode $G_C$ is removed.

Although the coupling capacitance exists between $G_S$ and $G_T$, between $G_S$ and $G_{ST}$, and between $G_S$ and $G_C$, as the constant potential is supplied to the electrode $G_S$, the transmission of the noise from $G_T$ to $G_{ST}$ or from $G_C$ to $G_{ST}$ can be prevented.

FIG. 5A is a schematic plan view, and FIG. 5B is a sectional view along the line A—A in FIG. 5A, including a potential model diagram.

As shown in FIG. 5A, in the second embodiment of the present invention, the transfer gate electrode $G_T$ and the clear gate electrode $G_C$, which are arranged in such a manner that the terminal portions thereof overlap the shield gate electrode $G_S$ in the conventional construction (see FIG. 2), are respectively separated from the storage gate electrode $G_{ST}$, and the shield gate electrode $G_S$, which is connected to the power supply line ($V_{CC}$ in n channel) and which is formed, for example, as one body, is provided therebetween (In the case of a p channel, the shield gate is connected directly to negative voltage power supply line).

In this construction, the power supply lines of force between the storage gate 4, the transfer gate 5, and clear gate 6 are cut off, and therefore, the coupling capacitance which conventionally exists between the storage gate 4, the transfer gate 5, and the clear gate 6 and which lowers the potential of the storage gate 4, can be completely removed.

Thereefore, in the charge transfer device according to the present invention, the potential level of the storage gate electrode $G_{ST}$, while the charge storage is carried out, is lowered along the curve having a high level, which is substantially equal to $C_{STD}$ in FIG. 3, and the signal having a high level is input to the automatic gain control (AGC) providing the amplifier.

Accordingly, the changing rate of the potential can be detected with a high accuracy in the high level region and with good linearity at the amplifier, and this detected signal is fed back to the timing system so as to adjust the time during which the charges are stored.

Thus, the time for storing the charges can be controlled with a high accuracy in accordance with the intensity of the light signal, so that the charge transfer device having a sensitivity corresponding to the intensity of the light signal can be obtained.

Figure 6:
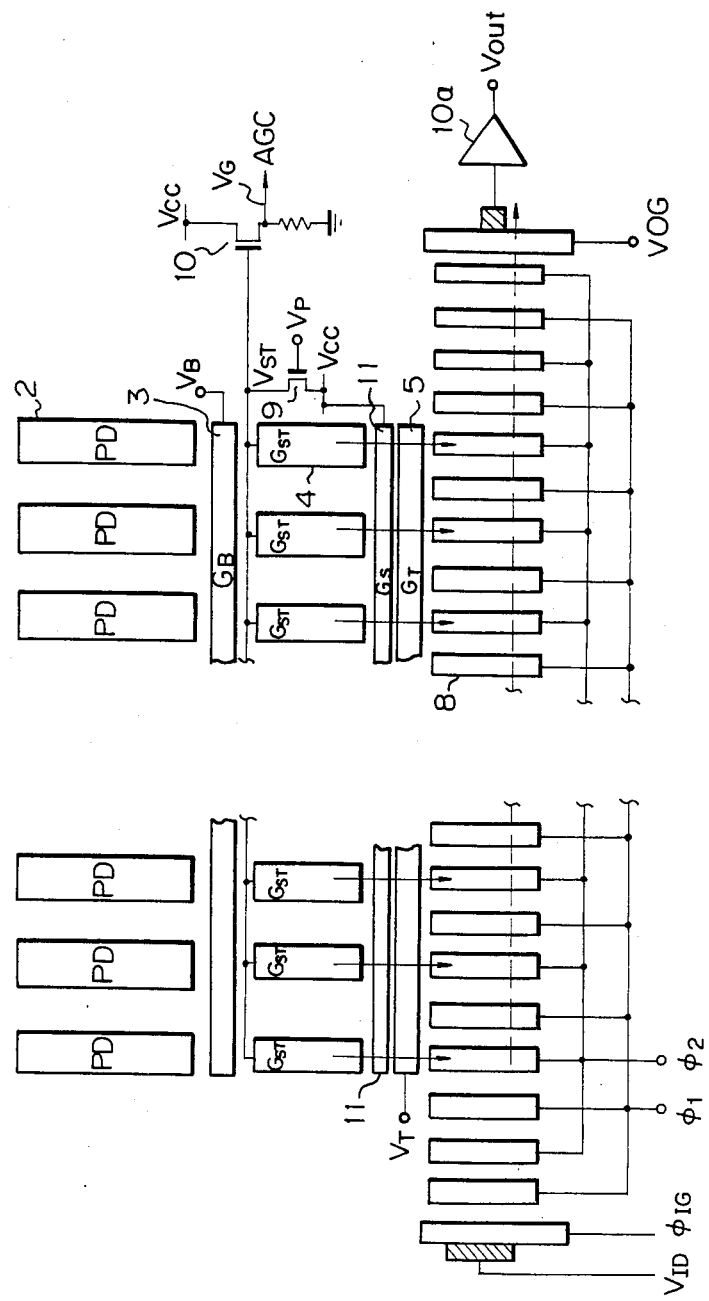
FIG. 6 is a schematic plan view showing the image sensor according to the present invention.

FIG. 6 is a general view of the embodiments shown in FIG. 2A and FIG. 5A. In FIG. 6, the reference numerals the same as shown in FIG. 2A and FIG. 5A show the same portions as shown in FIG. 2A and FIG. 5A. Note, the clear gate ($G_C$) 6 and the drain (D) 7 shown in FIGS. 2A and 5A are not shown in FIG. 6. Further, in FIG. 6, $V_{IG}$ designates an input gate, $V_{OG}$ designates an output gate, $\phi_{IG}$ designates a terminal used for measuring the characteristic of the image sensor, $10a$ designates an output amplifier which has generally the same construction as the buffer amplifier 10. In the construction shown in FIG. 6, the voltage under $V_{ST}$ electrode is selected to be higher than the voltage under $V_B$ electrode.

In FIG. 6, all $G_{ST}$ electrodes are commonly connected. Therefore, the voltage $V_{ST}$ becomes a voltage which corresponds to the mean value of the amount of charges stored in the charge storage gate electrode 4. Accordingly, when the portion 21 is added as in FIGS. 2A, 5A, and at the time when the amount of mean value of charges becomes a predetermined value, the transfer can be controlled at a real time so as to carry out the transfer from the charge storage gate electrode 4 to the register 8. Further, in FIG. 6, only one amplifier is used, however, a plurality of amplifiers may be used. For example, when a hundred storage gate electrodes $G_{ST}$ exist, twenty-five $G_{ST}$ electrodes are used as one group, the amplifier 10 is used in every group, and four AGC signals may be obtained. In this case, the following ways may be used: That is, one of the four AGC signals is used, the mean value of the four AGC signals is used as the final AGC signal, or the final AGC signal is used by calculating the four AGC signals. This is very advantageous, when many photo-diodes are used.

As mentioned above, according to the present invention, the charge transfer device having a high accuracy regardless of the intensity of the light signal which can be operated in the suitable sensitivity region, can be obtained, and thus it is possible by using such a charge transfer device to form an optical sensor having a photometric function which can be used in a camera which has a broader optical dynamic range.

In the above-mentioned embodiments, the explanation was given in the case where the light receiving portion and the charge storage portion are independent, however, the idea of the present invention can be applicable in the case where a transparent electrode is used as the electrode in the charge storage portion and the light receiving portion and the charge storage portion is formed by one body as the image sensor.

Figure 7:
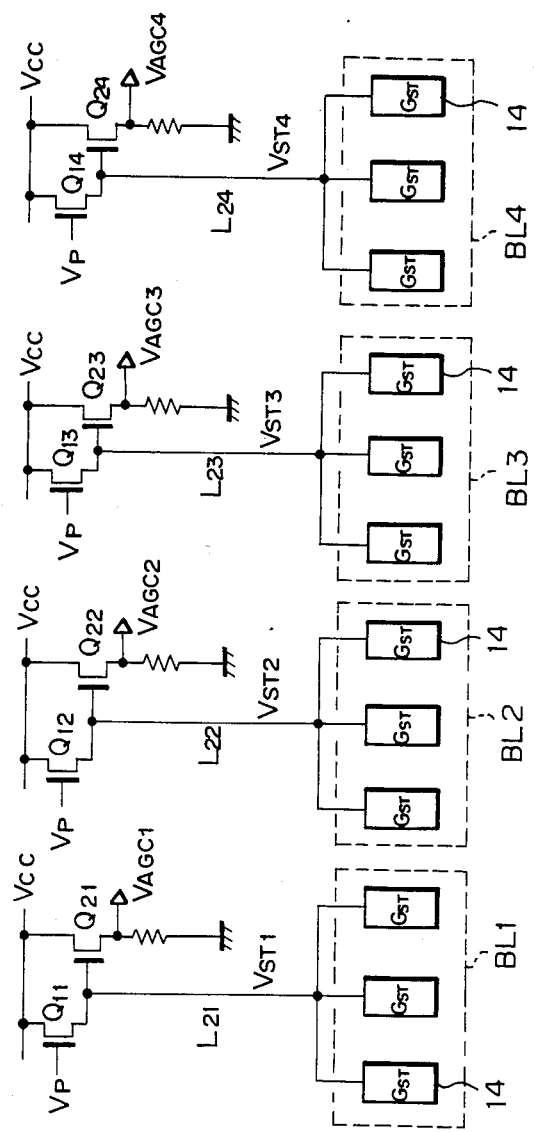
FIG. 7 is a third embodiment of the image sensor according to the present invention.

As shown in FIG. 7, all of the electrodes are divided into a plurality of blocks, such as, $BL_1$, $BL_2$, $BL_3$, $BL_4$, and a mean value (a partial mean value) is calculated in each block, so that the mean value of one block or the value calculated from mean values of more than two blocks may be used for carrying out the AGC. Further, in FIG. 7, 14 corresponds to the charge storage gate electrodes $G_{ST}$, which are connected in parallel in each block, and are connected via lines $L_{21} \sim L_{24}$ of each block to the transistors $Q_{11} \sim Q_{14}$ (corresponding to transistor 9 in FIG. 6) and the transistors $Q_{21} \sim Q_{24}$ (corresponding to transistor 10 in FIG. 6). The output voltages $V_{AGC1} \sim V_{AGC4}$ for automatic gain control are connected to the automatic control means.

We claim:

1. An image sensor comprising:
   charge storage means having MIS capacitors for storing charges corresponding to the amount of light received, each of said MIS capacitors having an electrode;
   charge transfer means having a plurality of stages for storing charges transfered from said charge storage means, said charges stored in said stages being transfered sequentially;
   transfer gate means for transfering charges from said charge storage means to said stages of said charge transfer means in response to a timing control signal;
   changing means for changing an electric potential of said electrode of each of said MIS capacitors in accordance with the amount of said charge stored in said MIS capacitors; and
   detecting means for detecting said electric potential of said electrode and for outputting the detected electric potential for generating said timing control signal.

2. An image sensor according to claim 1, wherein said changing means provides a precharge transistor, said precharge transistor is connected to said electrode, said electrode is precharged to a predetermined potential, and said electrode is, after precharging, placed in a floating state.

3. An image sensor according to claim 1, wherein said detecting means provides a buffer amplifier and the input of said buffer amplifier is high impedance.

4. An image sensor according to claim 1, wherein MIS capacitors are commonly connected.

5. An image sensor according to claim 1, wherein a plurality of said MIS capacitors are divided into a plurality of groups, electrodes of said MIS capacitors are commonly connected in each of said groups, and said detecting means provides a plurality of buffers provided corresponding to each of said groups.

6. An image sensor according to claim 1, further comprising:
   further transfer gate means having MIS construction, said further transfer gate means providing a gate electrode for applying a constant electric potential, said further transfer gate means being connected between said charge storage means and said transfer gate means, and
   charges stored in said charge storage means being transferred via said further transfer gate means to said transfer gate means.

7. An image sensor according to claim 1, further comprising:
   a pulse generating means connected between said detecting means and said transfer gate means; said pulse generating means generating a timing control signal by responding to the output of said detecting means.

8. An image sensor according to claim 7, wherein said pulse generating means provides a comparator for comparing the output potential of said detecting means with a reference voltage and a pulse generator circuit for outputting, by receiving the output of said comparator, a pulse having a predetermined width as a timing control signal.

9. An image sensor according to claim 8, wherein the value of said reference potential is set higher than the output potential of said detecting means when the amount of charge which are possible to store in said MIS capacitor are stored therein.

10. An image sensor according to claim 6 further comprising:
   a clear gate means for exhausting surplus charges in said charge storage means, and
   said further transfer gate means provided with said clear gate means and said charge storage means.

11. An image sensor according to claim 1, further comprising a clear gate means for exhausting surplus charge in said charge storage means; and
   a further transfer gate means provided with said clear gate means and said charge storage means.

12. An image sensor comprising:
   charge storage means having MIS capacitors for storing charges corresponding to the amount of light received, each of said MIS capacitors having an electrode;
   charge transfer means having a plurality of stages for storing charges transfered from said charge storage means, said charges stored in said stages being transfered sequentially;
   transfer gate means for transfering charges from said charge storage means to said stages of said charge transfer means in response to a timing control signal;
   changing means for changing an electric potential of said electrode of each of said MIS capacitors in accordance with the amount of said charge stored in said MIS capacitors, said charging means having a precharged transistor, said recharged transistor being connected to said electrode, said electrode being precharged to a predetermined potential and said electrode, after being precharged, being placed in a floating state; and
   detecting means for detecting said electric potential of said electrode and for outputting the detected electric potential for generating said timing control signal.

13. An image sensor comprising:
   photo sensing means for generating charges corresponding to the amount of light received;
   barrier gate means for generating a potential barrier;
   charge storage means having MIS capacitors for storing charges which are transferred beyond the potential barrier from said photo sensing means, each of said MIS capacitors having an electrode;
   precharge means, connected to the electrode of the MIS capacitors, for precharging the electrodes to a predetermined potential, wherein, after precharging, said electrodes are placed in a floating state;
   charge transfer means having a plurality of stages for storing charges transfered from said charge storage means, said charges stored in said stages being transfered sequentially;
   transfer gate means for transfering charges from said charge storage means to said stages of said charge transfer means in response to a timing control signal; and
   detecting means for detecting said electric potential of said electrode and for outputting the detected electric potential for generating said timing control signal.

* * * * *